(12) United States Patent
Morehead

(10) Patent No.: US 7,410,358 B2
(45) Date of Patent: Aug. 12, 2008

(54) MANNEQUIN WITH REPLACEABLE HAIR PIECE

(75) Inventor: Shawn Morehead, Knoxville, TN (US)

(73) Assignee: Mane Attachments, Knoxville, TN (US)

( * ) Notice: Subject to any disclaimer, the term of this patent is extended or adjusted under 35 U.S.C. 154(b) by 322 days.

(21) Appl. No.: 11/277,623

(22) Filed: Mar. 28, 2006

(65) Prior Publication Data

US 2007/0238388 A1 Oct. 11, 2007

(51) Int. Cl.
G09B 19/10 (2006.01)

(52) U.S. Cl. ...................................... 434/94

(58) Field of Classification Search .................. 434/94, 434/99, 100, 267, 295, 296; 446/319, 321
See application file for complete search history.

(56) References Cited

U.S. PATENT DOCUMENTS

| 3,225,489 | A |   | 12/1965 | Ryan |
|---|---|---|---|---|
| 3,279,122 | A |   | 10/1966 | Blenner |
| 3,448,540 | A | * | 6/1969 | Mucciante et al. .......... 446/337 |
| 3,458,943 | A | * | 8/1969 | Trowbridge .................. 434/94 |
| 3,808,736 | A | * | 5/1974 | Terzian et al. ............... 446/296 |
| 3,843,031 | A |   | 10/1974 | Oh et al. |
| 3,903,640 | A |   | 9/1975 | Dunn |
| 4,070,790 | A |   | 1/1978 | Strongin et al. |
| 4,403,962 | A | * | 9/1983 | La Vista ....................... 434/94 |
| 4,810,196 | A |   | 3/1989 | Walker |
| 4,874,345 | A |   | 10/1989 | Dirks |
| 5,041,050 | A |   | 8/1991 | Ritchey et al. |
| 5,090,910 | A | * | 2/1992 | Narlo .......................... 434/82 |
| 5,498,189 | A | * | 3/1996 | Townsend ................... 446/100 |
| 5,586,696 | A |   | 12/1996 | Martinez |
| 6,109,921 | A | * | 8/2000 | Yau ............................. 434/100 |
| 6,217,407 | B1 |   | 4/2001 | Laursen |
| 6,527,618 | B1 | * | 3/2003 | Faunda et al. ............... 446/394 |
| 2006/0008780 | A1 |   | 1/2006 | Pang |

\* cited by examiner

*Primary Examiner*—Kurt Fernstrom
(74) *Attorney, Agent, or Firm*—Knox Patents; Thomas A. Kulaga

(57) ABSTRACT

An apparatus having a support base and a removable hair portion for training personal appearance workers. In one embodiment, the releasable hair portion is the crown of a mannequin head and is detachably fixed to the support base of the mannequin head, which is adapted to be fixed to a work surface or mount. In another embodiment the releasable hair portion is the chin and surrounding area, which is detachably fixed to the support base of the mannequin head. The removable hair portion of the mannequin attaches to the support base of the mannequin head with a latching system that securely fixes the hair portion to the head. The latching system includes at least one fastening tab and a releasable clip that engages an opening in the support base. In another embodiment, a detent system is positioned between a fastening tab and the locking clip.

20 Claims, 5 Drawing Sheets

MANNEQUIN WITH REPLACEABLE HAIR PIECE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a mannequin head with a replaceable hair section, or portion. More particularly, this invention pertains to mannequin heads adapted for use in training barbers, hairdressers, beauticians, cosmetologists, and others in the art of hair cutting and trimming by allowing the portion of the mannequin with hair to be replaced after the hair has been rendered unusable for further training and/or practice.

2. Description of the Related Art

Barbers, hairdressers, hairstylists, beauticians, and cosmetologists provide hair care services that include cutting, trimming, and styling hair. These personal appearance workers often undergo extensive training in order to provide their services. Many schools and training facilities use humans as subjects for training and practice. Some schools and training facilities use mannequin heads for training and practice. The mannequin heads are typically mounted on a stand or table and the hair is permanently attached to a one-piece mannequin head. After the mannequin heads are rendered unusable for further training and practice, such as after the hair is cut too short for further cutting, the complete mannequin head is disposed as refuse.

Mannequin heads are commonly used for displaying wigs and hair pieces. For example, U.S. Pat. No. 3,843,031, titled "Mannequin head," discloses a two-piece mannequin head with a bald crown for supporting a wig. This type of mannequin is not suitable for training personal appearance workers because the hair is not firmly attached to the mannequin in a manner such that the hair can be handled for cutting and/or styling.

U.S. Pat. No. 3,458,943, titled "Model and method for teaching hair and wig styling," discloses an early attempt at providing a mannequin for teaching hair styling. The '943 patent discloses a mannequin head 10 with a bald crown. Attached to the crown in various segments 16 is the loop portion of a loop-and-hook system. Swatches of hair simulating material 12 have, around their periphery, the hook portion 15 of the loop-and-hook system. The swatches 12 are then selectively applied to the segments 16 of the mannequin head 10.

U.S. Pat. No. 5,586,696, titled "Hair growing mannequin head," discloses a mannequin head that is adapted for practicing hair styling and hair cutting. A pair of perforated helmet portions 22, 24 cooperates with a reel 20 supplying hair 16 that protrudes through the perforations. The hair 16 is automatically locked at a desired length after being fed through the perforations of the pair of helmet portions 22, 24 by a helmet offset locking means 30, which includes an outer locking tab 32 and an inner locking tab 34. By pressing the two tabs 32, 34 together, the perforations in each helmet portion 22, 24 are aligned, thereby allowing the hair 16 to freely pass through the perforations. Releasing the tabs 32, 34 allows a spring 35 to force the perforations to be misaligned, thereby locking the hair 16 in place.

It is not uncommon for toy dolls to have hair that is removable and replaceable. The following United States patents are representative of toys with removable and/or replaceable hair: U.S. Pat. No. 3,225,489, titled "Doll head and replaceable hairdo construction;" U.S. Pat. No. 3,279,122, titled "Detachable doll hairpiece;" U.S. Pat. No. 3,903,640, titled "Changeable hair doll;" U.S. Pat. No. 4,070,790, titled "Doll with releasably-attached hair pieces;" U.S. Pat. No. 5,041,050, titled "Doll head and detachable wig;" U.S. Pat. No. 6,217,407, titled "Method of producing a hairpiece which can be fastened on a toy figure, and toy figure with a hairpiece fastened thereon." The manner of attaching hair as disclosed in these patents related to toy dolls is typically is not suitable for adapting to mannequins for training personal appearance workers.

It is an objective of the present invention to provide a mannequin head having a reusable support base and a removable, replaceable hair portion with the removable hair portion having hair that is suitable for training personal appearance workers in styling and cutting of hair.

It is another objective for the removable hair portion to simulate human hair and be able to withstand the rigors of training, which include pulling, twisting, washing, and cutting. The removable hair portion must remain stable on the support base of the mannequin head and not be easily moved out of position by normal hair care methods. It is desirable for the complete mannequin head to be resistant to water or other fluid intrusion.

BRIEF SUMMARY OF THE INVENTION

According to one embodiment of the present invention, an apparatus for training personal appearance workers is provided. The apparatus is a mannequin head having a support base and a removable hair portion, or section. The removable hair portion has a latching system that includes at least one fastening tab and a locking clip for securing the removable hair portion to the support base. In another embodiment, the removable hair portion includes a detent system for providing additional means for securing the removable hair portion to the support base. The removable portion has an outer shell with a lip. The support base has an outer shell with a lip. In one embodiment, when the removable portion is attached the support base, the two lips engage by overlapping. In another embodiment the two lips engage when a protrusion on one lip is inserted in a channel in the other lip.

In one embodiment, the removable hair portion is a removable crown of a simulated head. In another embodiment, the removable hair portion includes the chin and upper lip of a simulated head. In this embodiment, the hair simulates a beard.

The support base is adapted to be mounted to a work support in a position suitable for use by a personal appearance worker. The hair on the removable hair portion is of sufficient length to allow for training and practice. In one embodiment the support base and the removable hair portion are hollow plastic forms filled with a foam or other filler and then sealed with a layer of plastic or other material. In this manner the forms maintain their shape and are not subject to damage by water or other fluid intrusion into the form.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for training personal appearance workers in the art of hair styling and/or hair cutting is disclosed. A mannequin head 100, 100' is provided with hair 106 that is suitable for personal appearance workers to use for training and/or practice. The mannequin head 100, 100' is adapted to be mounted to a work support. In conventional mannequins, the bottom of the neck has a cylindrical opening that receives a shaft that is attached typically to a clamp or a tripod. The clamp is attached to a table or other suitable object and the mannequin is secured to the shaft.

Figure 1:
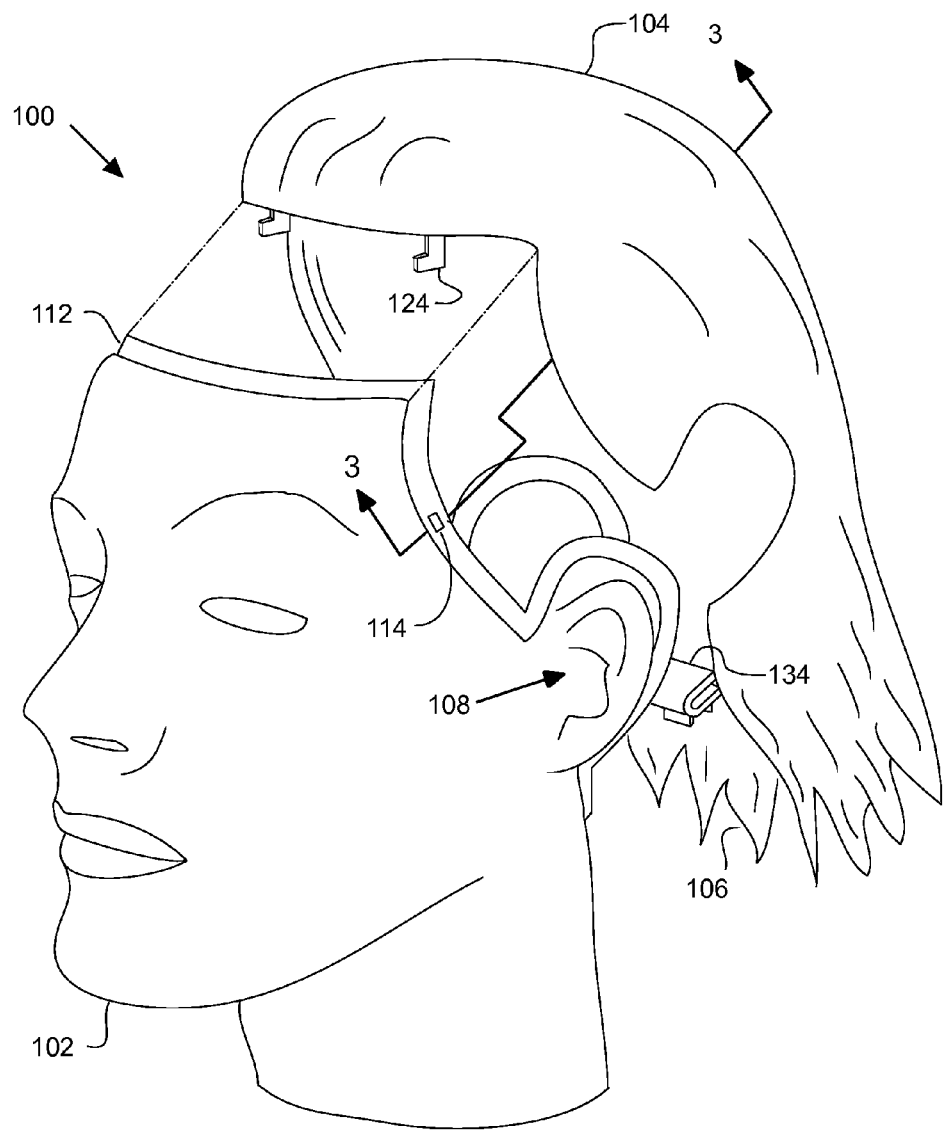
FIG. 1 is a perspective view of one embodiment of a mannequin head with a removable crown.

FIG. 1 illustrates a perspective view of one embodiment of a mannequin head 100 that simulates a human head. The illustrated embodiment of the mannequin head 100 includes a support base 102 and a removable crown, or hair portion, 104. The removable hair portion 104 is a section of the mannequin head 100 adapted to be removed from the support base 102 and replaced as desired. The support base 102 is adapted to be mounted to a work table or other support.

The removable crown 104 includes simulated hair 106, which is firmly attached to a portion of the outside surface of the removable crown 104. In various embodiments the simulated hair 106 is human hair, animal hair, a material that simulates hair, or a combination of two or more of these. The hair 106 is of a length suitable for cutting and/or styling. The removable crown 104 has a lip 312 that generally follows the hairline of a human being. That is, the removable crown 104 has a front edge coinciding with the top of the forehead and the sides extend down to and around the rear of the ears 108. The bottom rear of the removable crown 104 extends slightly down into the neck area.

Figure 5:
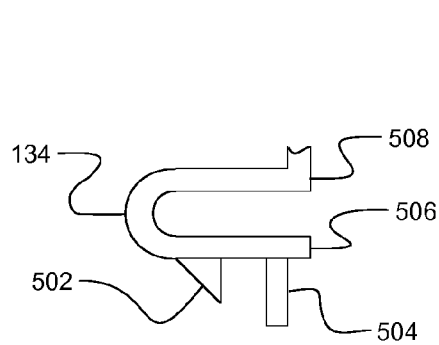
FIG. 5 is a side view of one embodiment of the locking clip.
Figure 6:
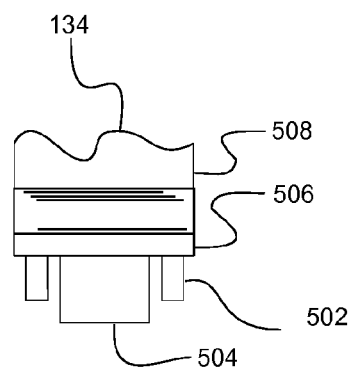
FIG. 6 is a front view of one embodiment of the locking clip.

The removable crown 104 is attached and secured to the support base 102 by a pair of fastening hooks, or tabs, 124 located near the front edge of the removable crown 104. The fastening hooks 124 engage notches, or openings, in the inside surface of the support base 102 behind the forehead area. The rear bottom of the removable crown 104 has a locking clip 134 that engages an opening in the neck area of the support base 102. The locking clip 134 is illustrated in FIGS. 5 and 6 and further described below.

The illustrated embodiment shows a recessed lip 112 around the edge of the support base 102 that mates with the removable crown 104. Along the side of the recessed lip 112 is a socket, or recess, 114 for the detent system that helps secure the removable crown 104 to the support base 102. In various embodiments, one or more sockets 114 are positioned on each side of the support base 102, for example, one in the temple area and another adjacent the ear 108. Those skilled in the art will recognize that the number and position of the sockets 114 and corresponding plugs 314 can vary without departing from the spirit and scope of the present invention.

To attach the removable crown 104 to the support base 102, the removable crown 104 is positioned adjacent the rear portion of the support base 102. The removable crown 104 is tilted such that the fastening hooks 124 engage the corresponding openings in the back of the forehead in the support base 102. The rear of the removable crown 104 is then tilted downward until the locking clip 134 engages the opening in the rear of the support base 102. The locking clip 134 locks the removable crown 104 to the support base 102 after the clip 134 is fully inserted and seated in the opening in the support base 102. To remove the removable crown 104 from the support base 102, the above steps are reversed.

Figure 2:
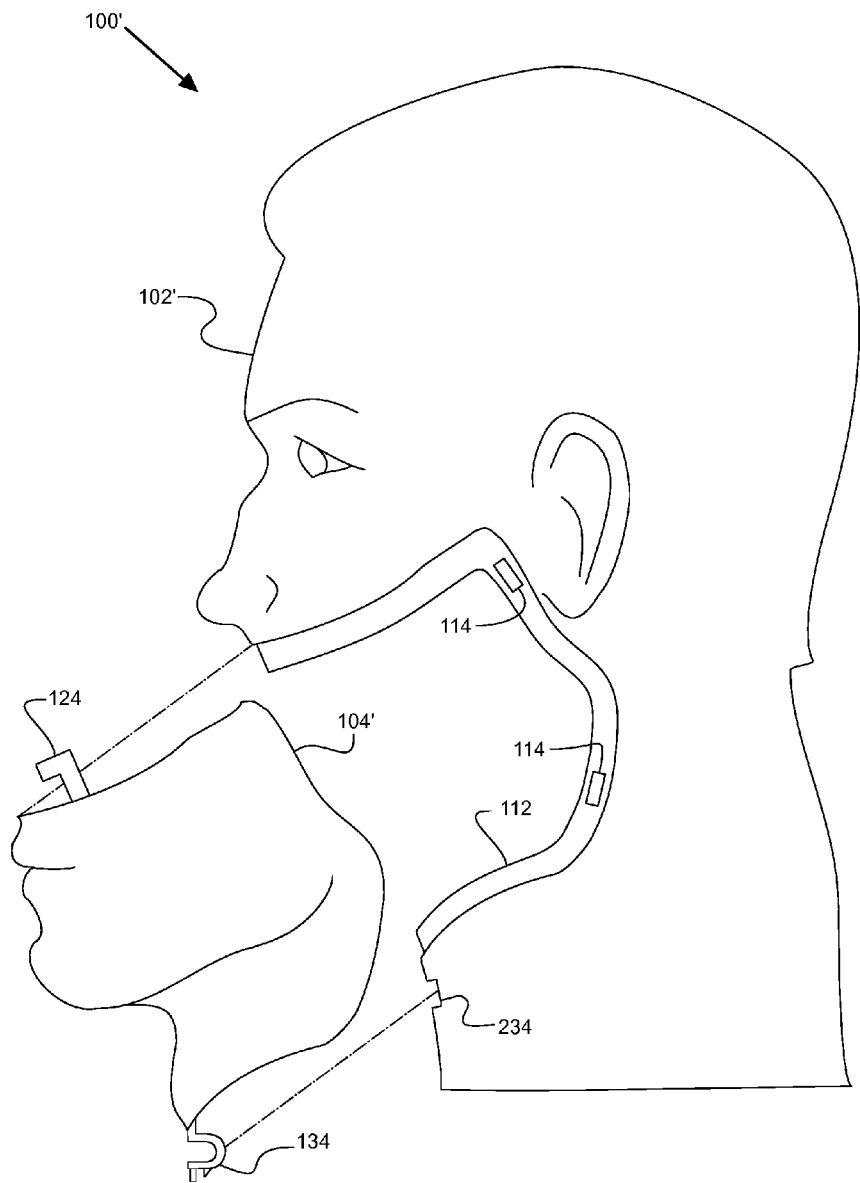
FIG. 2 is a perspective view of another embodiment of the mannequin head with a removable chin.

FIG. 2 illustrates a perspective view of another embodiment of the mannequin head 100' with a removable chin 104'. Personal appearance workers are oftentimes trained in the techniques of cutting and trimming beards. The embodiment illustrated in FIG. 2 allows for such a worker to practice those skills. The removable chin 104' is illustrated without the corresponding hair attached in order to allow the features to be seen in the figure. Although not illustrated, the removable chin 104' includes simulated hair 106, which is firmly attached to a portion of the outside surface of the removable chin 104'. In various embodiments the simulated hair 106 is human hair, animal hair, a material that simulates hair, or a combination of two or more of these. The hair 106 is of a length suitable for cutting and/or styling. The removable chin 104' has a lip 312 that generally follows the beard hairline of a male human being.

Surrounding the opening in the support base 102' into which the removable chin 104' fits is a recessed lip 112 that mates with a corresponding lip 312 on the edge of the removable chin 104'. The upper portion of the removable chin 104' has a pair of fastening hooks 124 protruding above the edge. The hooks 124 engage openings inside the support base 102'.

At the lower end of the removable chin 104' in the neck area is a locking clip 134 that engages a rectangular opening 234 in the neck of the support base 102'. In one embodiment, the opening 234 is a window into a chamber inside the support base 102'. The chamber is a small cavity inside the support base 102' that was its walls sealed to the outer shell 306 to prevent water and other fluids from entering the support base 102'. In a further embodiment, the chamber includes a weep hole below the opening 234 to allow any water or fluid that enters the chamber through the opening 234 to drain out of the chamber.

The illustrated embodiment shows two sockets 114 that engage corresponding plugs 314 in the removable chin 104'. The sockets 114 and plugs 314 are part of the detent system that secures the removable chin 104' to the support base 102' along with the fastening hooks 124 and the locking clip 134. In the illustrated embodiment, the sockets 114 are spaced substantially equidistant from the hooks 124 and clip 134. In other embodiments, the number and position of the sockets 114 and corresponding plugs 314 varies without departing from the spirit and scope of the present invention.

Figure 3:
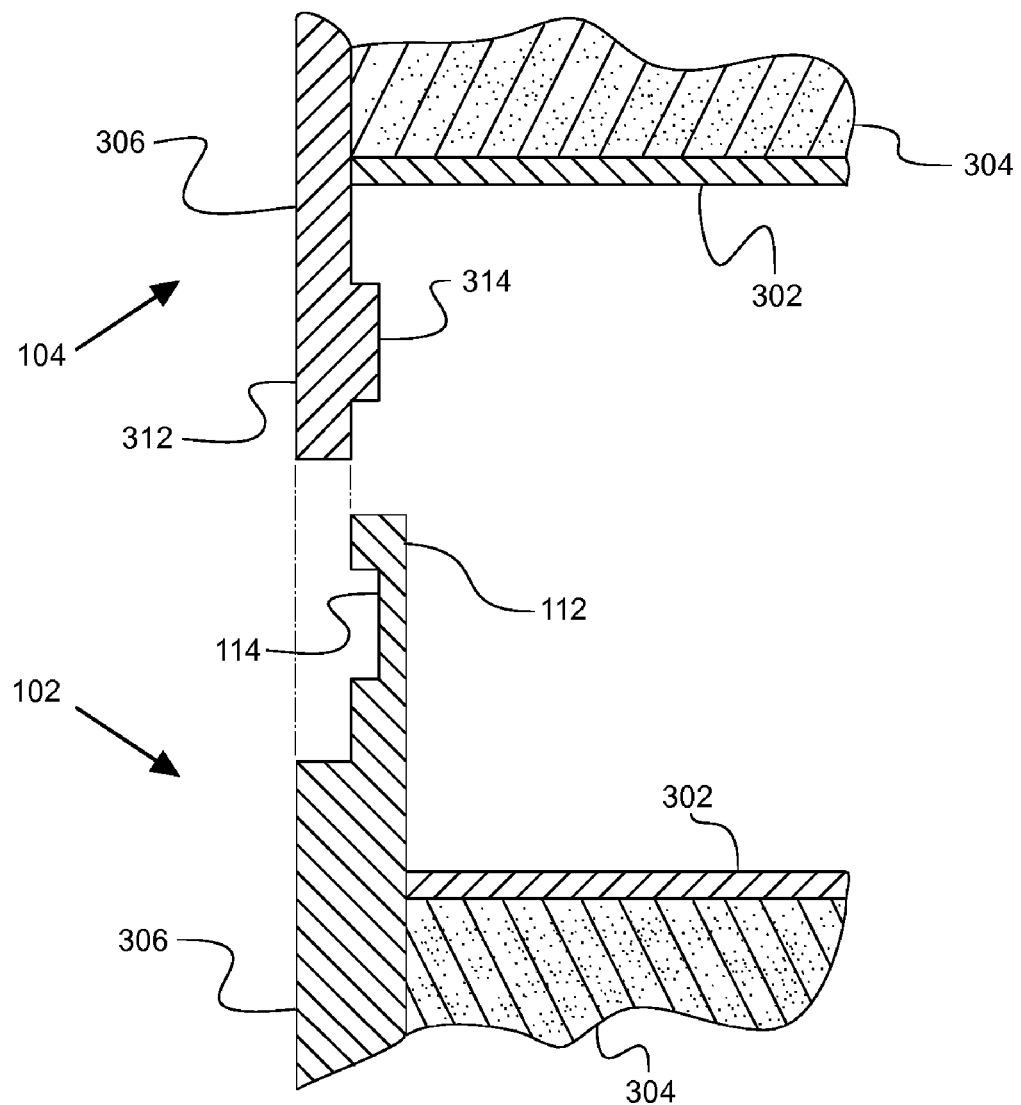
FIG. 3 is a cross-sectional view showing one embodiment of a seal and a detent system.

FIG. 3 illustrates a cross-sectional view showing one embodiment of a seal and a detent system for the mannequin head 100, 100'. The support base 102, 102' includes an outer shell 306, a filler 304, and a barrier 302. The hair portion 104, 104' also includes an outer shell 306, a filler 304, and a barrier 302. In one embodiment the outer shell 306 is a pliable, soft, waterproof material that simulates human flesh. The filler 304, in one embodiment, is a stiff material that serves to maintain the shape of the support base 102, 102' and the removable hair portion 104, 104'. In one embodiment, the filler 304 is a closed cell foam, such as a polystyrene foam.

In various embodiments, the barrier 302 is a plastic sheet, film, or covering that encapsulates the filler 304 within the outer shell 306. The barrier 302 forms a substantially watertight seal with the outer shell 306 to prevent the intrusion of water or other fluids. In one embodiment, a barrier 302 fabricated of a stiff plastic material serves to help maintain the shape of the removable portion 104, 104' and the support base 102, 102' by adding rigidity to the open end of the outer shell 306.

The outer shell 306 of the removable portion 104, 104' has a lip 312 that extends away from the barrier 302. The lip 312 has a plug, or protrusion, 314 extending into the interior portion of the outer shell 306. The plug 314 is sized to engage the socket 114 in the lip 112 of the support base 102, 102'. In one embodiment, the plug 314 has rounded edges to aid in engaging the socket 114. In another embodiment, the plug 314 is positioned on lip 112 and the socket 114 is positioned on the other lip 312.

The lip 312 on the removable portion 104, 104' engages the lip 112 on the support base 102, 102' when the two lips 112, 312 overlap when the removable portion 104, 104' is attached to the support base 102, 102'. The overlapping lips 112, 312 provide a mating connection between the removable portion 104, 104' and the support base 102, 102'. The overlapping lips 112, 312 provide stability to the removable portion 104, 104' when mounted on the support base 102, 102' and also serves to minimize water and fluid intrusion into the space between the removable portion 104, 104' and the support base 102, 102'. In another embodiment, the outside lip 312 is associated with the support base 102, 102' and the inside lip 112 is associated with the removable portion 104, 104'.

Figure 4:
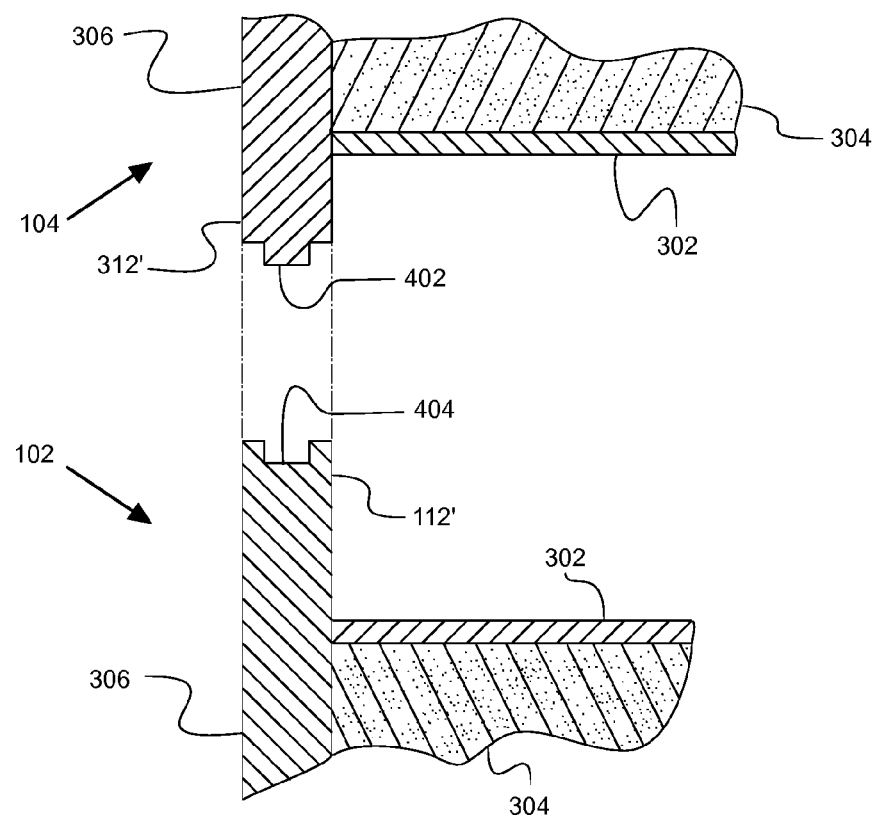
FIG. 4 is a cross-sectional view showing another embodiment of a seal between the removable section and the base.

FIG. 4 illustrates a cross-sectional view showing another embodiment of a seal between the removable portion 104, 104' and the support base 102, 102'. In the illustrated embodiment, the outer shell 306 of the removable portion 104, 104' has a lip 312' with a protrusion 402. The protrusion 402 mates with a slot 404 in the lip 112' of the outer shell 306 of the support base 102, 102'. In one embodiment the protrusion 402 and the slot 404 run along the full length of the lips 112', 312' of the outer shell 306. In another embodiment, the protrusion 402 and the slot 404 have a length that is less than that of the full circumference of the outer shell 306.

The engagement of the protrusion 402 into the slot 404 adds stability to the connection of the removable portion 104, 104' and the support base 102, 102' and also serves to minimize water and fluid intrusion into the space between the removable portion 104, 104' and the support base 102, 102'. In another embodiment, the protrusion 402 is associated with the outer shell 306 of the support base 102, 102', and the channel 404 is associated with the outer shell 306 of the removable portion 104, 104'.

Figure 7:
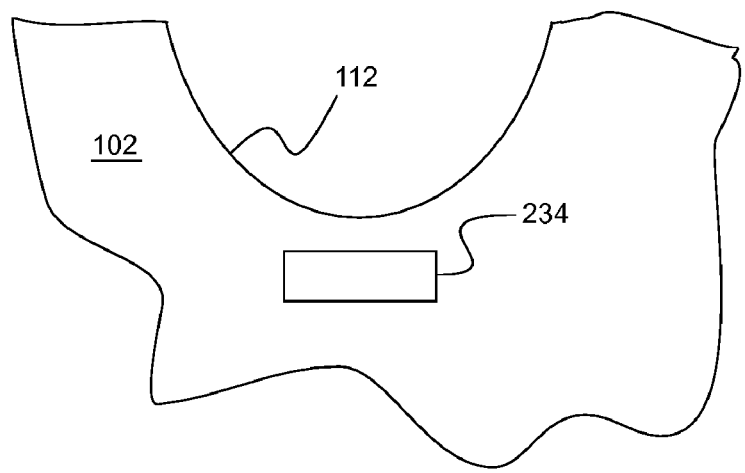
FIG. 7 is a partial side view of one embodiment of the neck of the support base where the locking clip engages the support base.

FIG. 5 illustrates a side view of the locking clip 134. FIG. 6 illustrates a front view of the locking clip 134. FIG. 7 illustrates a partial side view of the bottom of the neck of the support base 102, 102' showing the rectangular opening 234. The removable portion 104, 104' attaches to the support base 102, 102' by first engaging the fastening hooks 124 with openings in the support base 102, 102' and then swinging, or pivoting, the removable portion 104, 104' toward the support base 102, 102' until the locking clip 134 engages the opening 234 in the support base 102, 102'.

The locking clip 134 has a C-shape and is flexible such that the free end 506 of the clip 134 is resiliently movable toward the fixed end 508 of the clip 134. When the clip 134 first engages the rectangular opening 234, the wedge-shaped tab 502 strikes the bottom edge of the opening 234 and as the clip 134 moves further into the opening 234, the wedge-shaped tab 502 forces the C-shape to close, bringing the two ends 506, 508 of the clip 134 together sufficiently such that the wedge-shaped tab 502 passes through the opening 234. As soon as the wedge-shaped tab 502 passes through the opening 234, the C-shaped clip 134 springs back toward its original shape with the two ends 506, 508 separated. As the clip 134 moves further into the opening 234, the stop tab 504 contacts the outside surface of the outer shell 306, which is when the clip 134 is fully engaged. The outer shell 306, in which the opening 234 is located, has a thickness that fits between the wedge-shaped tab 502 and the stop tab 504. With the clip 134 fully engaged in the opening 234, the outer shell 306 is captured between the wedge-shaped tab 502 and the stop tab 504, preventing the clip 134 from being removed or inserted further.

The removable portion 104, 104' is disconnected from the support base 102, 102' by manually moving the free end 506 of the locking clip 134 toward the fixed end 508 of the clip 134 and pulling the clip 134 out of the opening 234. As soon as the C-shaped clip 134 is deformed sufficiently to allow the wedge-shaped tab 502 to clear the edge of the opening 234, the clip 134 will freely pass through and out of the opening 234.

Figure 8:
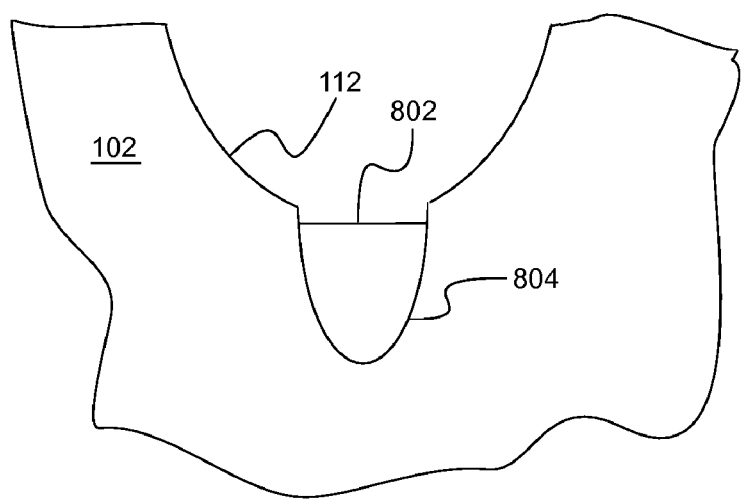
FIG. 8 is a partial side view of another embodiment of the bottom of the neck of the support base.
Figure 9:
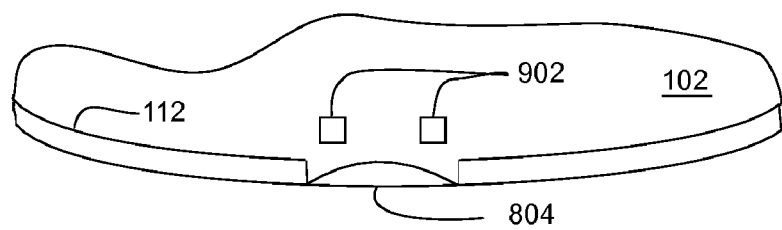
FIG. 9 is a partial top view of the bottom of the neck of the support base illustrated in FIG. 8.

FIG. 8 illustrates a partial rear view of another embodiment of the bottom of the neck of the support base 102, 102'. FIG. 9 illustrates a partial top view of the bottom of the neck of the support base 102, 102' illustrated in FIG. 8. In the embodiment illustrated in FIGS. 8 and 9, the part of the support base 102, 102' where the locking clip 134 engages has a flat surface 802 with a pair of openings 902 for receiving the wedge-shaped tabs 502 when the clip 134 is engaged. When the locking clip 134 of the removable portion 104 engages the support base 102, the wedge-shaped tabs 502 slide across the flat surface 802 until the tabs 502 encounter the pair of openings 902, at which point the wedge-shaped tabs 502 engage the pair of openings 902 by the spring force in the locking clip 134 due to the compression of the C-shape of the clip 134.

In still another embodiment, the two wedge-shaped tabs 502 on the locking clip 134 slide over the lip 112 of the support base 102 as the removable portion 104, 104' is attached to the support base 102, 102'. The lip 112 is then positioned between the wedge-shaped tab 502 and the stop tab 504 thereby securing the removable portion 104, 104' to the support base 102, 102'.

In various embodiments, such as illustrated in FIGS. 8 and 9, the neck of the support base 102, 102' has a recessed area 804 below where the free end 506 of the locking clip 134 is located when the clip 134 is engaging the support base 102, 102'. The recessed area 804 allows easy access to the free end 506 for compressing the C-shape of the locking clip 134 to disengage the clip 134 from the support base 102, 102'.

The mannequin head 100, 100' includes various functions. The function of connecting the hair portion 104, 104' to the support base 102, 102' is implemented, in one embodiment, by the overlapping lips 112, 312 as illustrated in FIGS. 1, 2, and 3. In another embodiment, the function is implemented by the protrusion 402 engaging the channel 404 in the lips 112', 312' of the outer shells of the hair portion 104, 104' and the support base 102, 102'.

The function of locking the removable portion 104, 104' to the support base 102, 102' is implemented, in one embodiment, by the locking clip 134. In various embodiments the locking clip 134 engages a rectangular opening 234 as illustrated in FIGS. 2 and 7, the locking clip 134 engages a flat area 802 with a pair of openings 902 as illustrated in FIGS. 8 and 9, or the locking clip 134 engages the lip 112 of the outer shell 306 of the support base 102, 102'. The opening being engaged in each of these cases is the rectangular opening 234, the openings 902 in the flat area 802, and the opening in the outer shell 306 of the support base 102, 102', respectively.

From the foregoing description, it will be recognized by those skilled in the art that a mannequin head 100 for use by personal appearance workers has been provided. The mannequin head 100 includes a support base 102 that includes means for attaching the base 102 to a work support. The mannequin head 100 also includes a removable section 104 that has hair 106 suitable for training and practice. The removable section 104 has a latching system that includes at least one fastening tab, or hook, 124 that engages a corresponding opening in the base 102 and a locking clip 134 that engages a corresponding opening 234, 902 in the base 102. The removable section 104 includes a lip 312 that engages a corresponding lip 112 on the base 102. In another embodiment, the mannequin head 100 has a detent system that includes at least one socket 114 and a corresponding plug 314. The each plug 314 mates with the corresponding socket 114 as the two lips 112, 312 overlap when the removable section 104 is attached to the base 102.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus simulating a human head with hair for training personal appearance workers, said apparatus comprising:
    a support base being a portion of a mannequin head, said support base having a first outer shell, a first filler, and a first barrier, said first filler sealed in said first outer shell of said support base by said first barrier, said support base having a first lip at an edge of said first outer shell, said support base adapted to be mounted to a work support;
    a hair portion having a second outer shell, a second filler, and a second barrier, said second filler sealed in said second outer shell of said hair portion by said second barrier, said hair portion having a plurality of simulated hair attached to a portion of an outside surface of said hair portion, said hair portion having a second lip at an edge of said second outer shell, said second lip overlapping said first lip when said hair portion is attached to said support base;
    at least one fastening tab attached to said hair portion, said at least one fastening tab engaging a corresponding opening in said support base;
    a locking clip attached to said hair portion at an end of said hair portion substantially opposite said at least one fastening tab, said locking clip engaging an opening in said support base, said locking clip securing said hair portion to said support base when said locking clip is fully engaged in said opening in said support base; and
    a detent system associated with said first lip and said second lip, said detent system engaged when said first lip is adjacent said second lip;
    whereby said hair portion attached to said support base simulates the human head with hair.

2. The apparatus of claim 1 wherein said detent system includes at least one socket and at least one plug, each one of said at least one plug engaging a corresponding one of said at least one socket when said hair portion is attached to said support base.

3. The apparatus of claim 1 wherein said hair portion includes a crown of said mannequin head.

4. The apparatus of claim 1 wherein said hair portion includes a chin of said mannequin head whereby said plurality of simulated hair is representative of a beard.

5. An apparatus simulating a human head with hair for training personal appearance workers, said apparatus comprising:
    a support base being a portion of a mannequin head, said support base having a first outer shell and a first lip adjacent an edge of said first outer shell;
    a hair portion having a second outer shell and a second lip adjacent an edge of said second outer shell, said second lip adjacent said first lip when said hair portion is attached to said support base, said hair portion having a plurality of simulated hair attached to a portion of an outside surface of said hair portion;
    at least one fastening tab attached to said hair portion, said at least one fastening tab engaging a corresponding opening in said support base; and
    a locking clip attached to said hair portion at an end of said hair portion substantially opposite said at least one fastening tab, said locking clip engaging said support base, said locking clip securing said hair portion to said support base when said locking clip fully engages said support base;
    whereby said hair portion attached to said support base simulates the human head with hair.

6. The apparatus of claim 5 further including means for connecting said hair portion to said support base.

7. The apparatus of claim 5 wherein said support base has a first filler and a first barrier, said first filler sealed in said first outer shell of said support base by said first barrier.

8. The apparatus of claim 5 wherein said hair portion has a second filler and a second barrier, said second filler sealed in said second outer shell of said hair portion by said second barrier.

9. The apparatus of claim 5 wherein said first lip overlaps said second lip when said hair portion is attached to said support base.

10. The apparatus of claim 5 wherein said first lip includes one of a protrusion and a channel and said second lip includes the other of said protrusion and said channel, said protrusion engaging said channel when said hair portion is attached to said support base.

11. The apparatus of claim 5 wherein said detent system includes at least one socket and at least one plug, each one of said at least one plug engaging a corresponding one of said at least one socket when said hair portion is attached to said support base.

12. The apparatus of claim 5 wherein said hair portion includes one of a crown of said mannequin head and a chin of said mannequin head whereby said plurality of simulated hair is representative of a beard.

13. An apparatus simulating human hair for training personal appearance workers, said apparatus comprising:
- a section of a mannequin head having an outer shell with a lip, said lip adapted to be adjacent a support base of said mannequin head, said section having a plurality of simulated hair extending from a portion of an outside surface of said outer shell;
- at least one fastening tab attached to said section of said mannequin head, said at least one fastening tab for engaging a corresponding opening in said support base of said mannequin head; and
- a locking clip attached to said section of said mannequin head at an end of said section substantially opposite said at least one fastening tab, said locking clip for engaging said support base and locking said section to said support base when said locking clip fully engages said support base of said mannequin head.

14. The apparatus of claim 13 wherein said section of said mannequin head includes one half of a detent system, said detent system includes at least one socket and at least one plug, each one of said at least one plug engaging a corresponding one of said at least one socket when said section is attached to said support base of said mannequin head.

15. The apparatus of claim 13 wherein said section of said mannequin head includes a crown of a mannequin head.

16. The apparatus of claim 13 wherein said section of said mannequin head includes a chin of said mannequin head whereby said plurality of simulated hair is representative of a beard.

17. The apparatus of claim 13 wherein said section of said mannequin head further includes a filler and a barrier, said filler sealed in said outer shell of said section by said barrier.

18. The apparatus of claim 13 wherein said section of said mannequin head includes means for connecting said section to said support base.

19. The apparatus of claim 13 wherein said lip overlaps a second lip on said support base when said section is attached to said support base.

20. The apparatus of claim 13 wherein said lip includes one of a protrusion and a channel and a second lip on said support base includes the other of said protrusion and said channel, said protrusion engaging said channel when said section is attached to said support base.

\* \* \* \* \*